United States Patent
Flamme

(10) Patent No.: US 9,027,424 B2
(45) Date of Patent: May 12, 2015

(54) DISPLACEMENT DRIVE

(75) Inventor: Klaus Peter Flamme, Buchloe (DE)

(73) Assignee: DewertOkin GmbH, Kirchlengern (DE)

( * ) Notice: Subject to any disclaimer, the term of this patent is extended or adjusted under 35 U.S.C. 154(b) by 430 days.

(21) Appl. No.: 13/610,539

(22) Filed: Sep. 11, 2012

(65) Prior Publication Data
US 2013/0239713 A1  Sep. 19, 2013

(30) Foreign Application Priority Data
Sep. 12, 2011  (DE) .................. 20 2011 105 570

(51) Int. Cl.
*F16H 25/20* (2006.01)
*F16H 25/24* (2006.01)
*H02K 7/06* (2006.01)

(52) U.S. Cl.
CPC ............ *F16H 25/20* (2013.01); *F16H 25/2409* (2013.01); *F16H 2025/2084* (2013.01); *F16H 2025/209* (2013.01); *H02K 7/06* (2013.01)

(58) Field of Classification Search
USPC .................. 74/89.24, 89.32, 89.33
See application file for complete search history.

(56) References Cited

U.S. PATENT DOCUMENTS

| 1,794,614 | A | * | 3/1931 | Hochman | .................. 74/89.35 |
| 2,590,745 | A | * | 3/1952 | Wuensch | ..................... 74/625 |
| 4,986,725 | A | * | 1/1991 | Geka | ..................... 198/750.11 |
| 5,117,701 | A | * | 6/1992 | Thuries et al. | ............... 74/89.24 |
| 5,549,015 | A | * | 8/1996 | Aiso et al. | .................... 74/89.34 |

* cited by examiner

*Primary Examiner* — William Kelleher
*Assistant Examiner* — Terence Boes
(74) *Attorney, Agent, or Firm* — Grossman Tucker Perreault & Pfleger, PLLC

(57) ABSTRACT

The invention concerns a displacement device comprising a transmission 2 driven by an electric motor 1, guide rails 5, a displacement slider 6, a transmission housing 8 and a closure cover 7, characterized in that an externally threaded nut (4) is arranged longitudinally slidably on a profile bar (3) between the transmission (2) and said externally threaded nut (4) and said externally threaded nut (4) is mounted rotatably in a displacement slider (6) in such a way that said externally threaded nut (4) is longitudinally displaced upon rotation by the transmission (2) which is driven by the drive motor (1) and the profile bar (3) in the thread profile segments of the guide rails (5) and is displaced along the guide rails (5) by way of the end run-on surfaces (9) of the displacement slider (6).

5 Claims, 1 Drawing Sheet

DISPLACEMENT DRIVE

BACKGROUND

Linear drives are known which perform longitudinal movements without threaded spindles. They use rack-and-pinion transmissions in which a rack is longitudinally displaced by means of an electric motor by way of transmissions and gears. Drives are also known in which a motor-transmission unit is longitudinally displaced by way of gears on threaded spindles. Coarse-threaded drives are also known in which the longitudinal movements are produced by rotation of a threaded tube. All those drives are very complicated and expensive in terms of structure and require expensive drive components.

Object

The object of the invention is to provide a drive which performs the longitudinal movement with few components.

DESCRIPTION OF THE FIGURES

The features of this disclosure, and the manner of attaining them, will become more apparent and better understood by reference to the following description taken in conjunction with the accompanying drawings, wherein.

DETAILED DESCRIPTION

Figure 3:
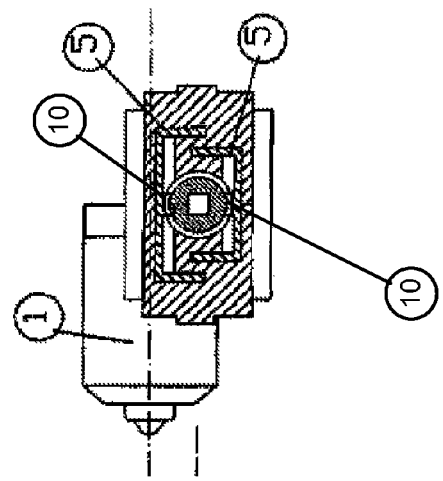
FIG. 3 is a top view of the displacement drive of FIG. 1 with a cross-section along line C-C of FIG. 2.
Figure 2:
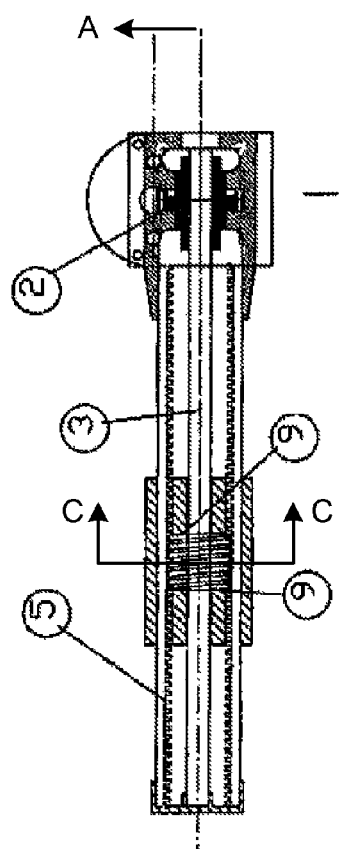
FIG. 2 is a side view of the displacement drive of FIG. 1 with a cross-section taken along line B-B of FIG. 1.
Figure 1:
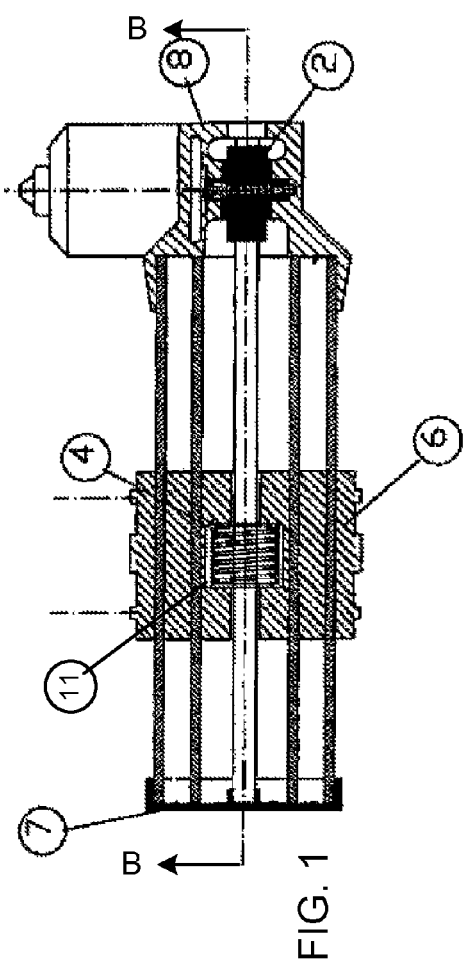
FIG. 1 is a front view of a displacement drive according to the present disclosure with a cross-section taken along line A-A of FIG. 2.
Figure 4:
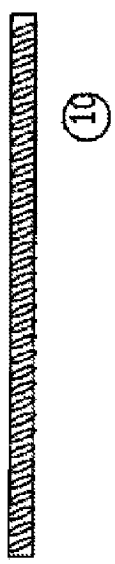
FIG. 4 is a side longitudinal view of the thread profile segment.

That object is attained by the use of a simple profile bar 3 which forms the connection from the worm gear transmission 2 to an externally threaded nut 4, the latter being arranged longitudinally slidably on the bar 3. The externally threaded nut 4 is mounted in a recess 11 in the displacement slider 6 in such a way that it can rotate freely in its mounting which is associated with the displacement slider 6 and the ends 9 of the externally threaded nut 4 longitudinally entrain the displacement slider 6. The external male thread on the externally threaded nut 4 engages into the thread profile segments 10 of the guide rails 5. Those thread profile segments 10 are fixedly connected to the guide rails 5. Upon rotation of the externally threaded nut 4 it is longitudinally moved in the thread segments 10 of the guide rails 5 and the externally threaded nut 4 will longitudinally displace the displacement slider 6 by way of the ends 9 of the externally threaded nut 4 in the recess 11 in the displacement slider 6.

The profile bars 3 between the worm gear transmission 2 and the externally threaded nut 4 can be in the form of round bars with a longitudinal groove, in the form of multi-spline shafts or of an angular configuration.

According to the invention this drive comprises an electric motor 1 mounted in the transmission housing 8, with the transmission 2, preferably a worm gear transmission 2, guide rails 5 screwed to the transmission housing 8, with the displacement slider 6 longitudinally slidable therein, and a closure cover 7 screwed to the guide rails 5, a profile bar 3 arranged between the transmission 2 and the closure cover 7 and the externally threaded nut 4 mounted in the displacement slider 6. Fixedly arranged on the guide rails 5 are thread profile segments provided with limit switches for limiting the displacement travel.

The invention claimed is:

1. A displacement drive comprising a transmission driven by an electric motor, guide rails having thread profile segments, a displacement slider, a transmission housing and a closure cover, wherein an externally threaded nut is arranged longitudinally slidably on a profile bar connected to the transmission and said externally threaded nut engages into said thread profile segments of said guide rail and is mounted rotatably in said displacement slider in such a way that said externally threaded nut is longitudinally displaced upon rotation by the transmission which is driven by said electric motor and the profile bar wherein said externally threaded nut rotates while engaged in the thread profile segments of the guide rails and said externally threaded nut is displaced along the guide rails wherein the nut drives the displacement slider via the end run-on surfaces on said displacement slider.

2. A displacement drive as set forth in claim 1 wherein the guide rails are each produced in one piece.

3. A displacement drive as set forth in claim 1 wherein a profile of the thread profile segments is such that externally threaded nuts with different pitches can engage therein.

4. A displacement drive as set forth in claim 1 wherein the displacement slider comprises two symmetrical parts which are screwed together and thereby the externally threaded nut is mounted rotatably and longitudinally non-slidably.

5. The displacement drive as set forth in claim 1 wherein said thread profile segments are fixedly connected to said guide rails.

* * * * *